T. R. BUTTS.
WATER METER.
APPLICATION FILED MAY 21, 1910.
1,008,446.
Patented Nov. 14, 1911.
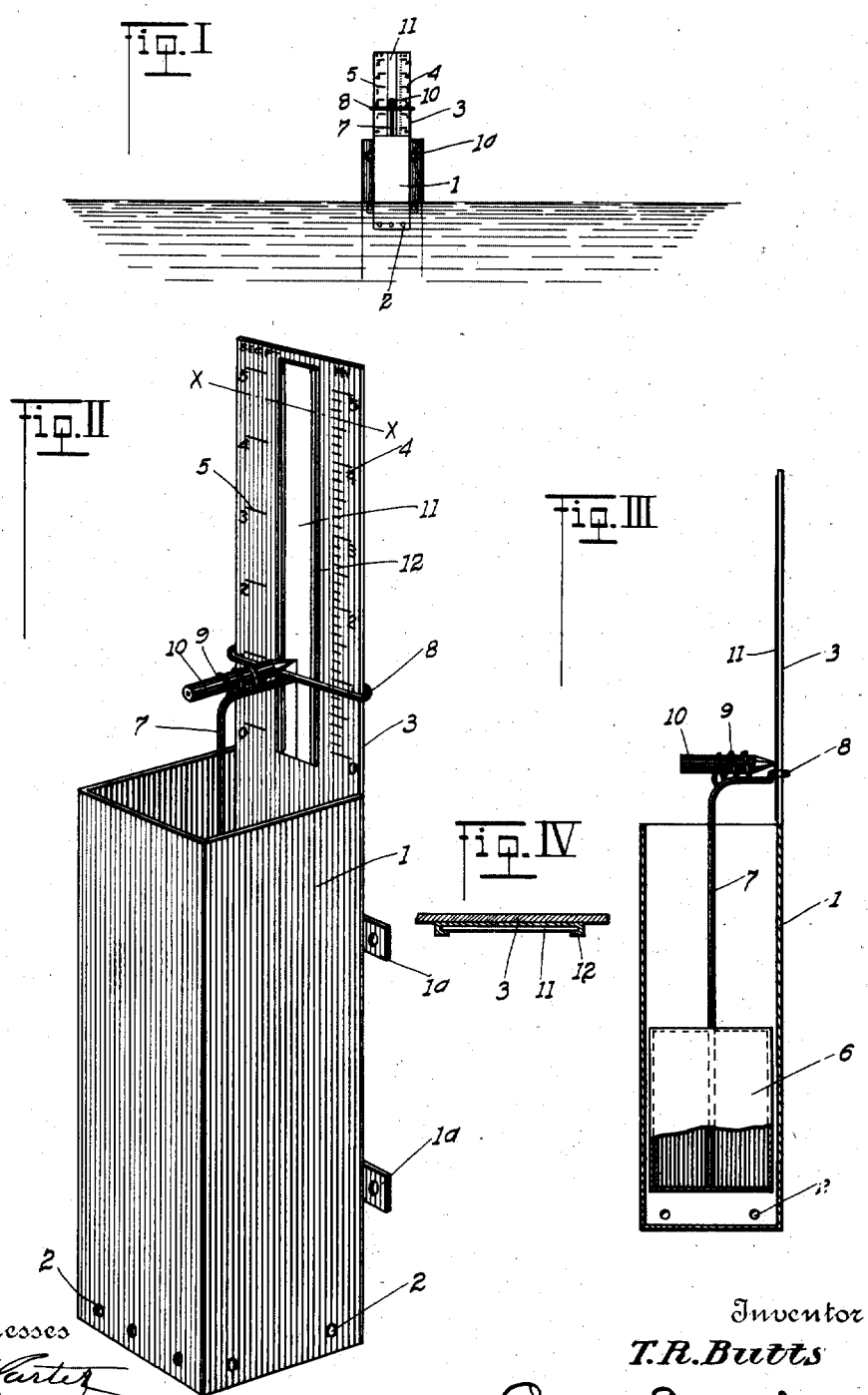
Witnesses
F. H. Carter
Cora B. Carter
Inventor
T. R. Butts
Percy D. Webster
Attorney

UNITED STATES PATENT OFFICE.

THOMPSON R. BUTTS, OF MODESTO, CALIFORNIA.

WATER-METER.

1,008,446.  Specification of Letters Patent.  Patented Nov. 14, 1911.

Application filed May 21, 1910. Serial No. 562,607.

*To all whom it may concern:*

Be it known that I, THOMPSON R. BUTTS, a citizen of the United States, residing at Modesto, in the county of Stanislaus, State of California, have invented certain new and useful Improvements in Water-Meters; and I do declare the following to be a full, clear, and exact description of the same, such as will enable others skilled in the art to which it appertains to make and use the same, reference being had to the accompanying drawings, and to the characters of reference marked thereon, which form a part hereof.

This invention relates to improvements in water gages or meters and particularly to that kind used for measuring water in irrigation ditches or the like, the object of the invention being to produce a means for measuring the second feet going over the weir in such a manner as to give a fairly accurate estimate of the amount of water consumed by any one person both for the benefit of the person, firm or corporation supplying the water and for the consumer.

A further object of the invention is to produce such a device as will be simple and inexpensive and yet one which will be exceedingly effective for the purposes for which it is designed.

These objects, I accomplish by means of such structure and relative arrangement of parts as will fully appear by a perusal of the following specification and claim:

In the drawings similar characters of reference indicate corresponding parts in the several views.

Figure I is a front elevation of my improved meter as it appears when in use. Fig. II is a perspective view of the complete device. Fig. III is a vertical section of the same. Fig. IV is a sectional view taken on a line X—X of Fig. II.

Referring now more particularly to the characters of reference on the drawings 1 designates a box having means (1ª) whereby it can be fastened into the gate or box of the ditch, said member also having water inlet holes 2 in its lower end and upwardly projecting from which box 1 is a board or plate 3. On one side of this member 3 is a scale 4 indicating the number of inches in depth of the water flowing over the weir while on the other side of said member 3 is a scale 5 indicating the number of second feet per inch of water which so flows over the weir. Movable in the box 1 is a float 6 adapted to float on the top of the water entering into said box 1 through the holes 2 such float 6 having an upwardly projecting rod 7 having a guide 8 extending around said member 3. The upper end of said rod 7 has a coiled spring 9 or other retaining means carrying a pencil or marker 10 which moves over a paper or card 11 inserted in a slotted guide 12 on the member 3. The float 6 rising on the water in the gateway causes the pencil 10 to mark the maximum length of its rise and thus indicates by the scale 4 the number of inches in depth of water flowing over the weir and the same having been previously measured to ascertain the second feet of water per inch of depth the scale 4 indicates the number of second feet flowing into the ditch and thus taking the time of the flow and the amount of second feet flowing, the average amount of water can readily be determined.

The box 1 may be made of any suitable material such as wood, galvanized iron or the like.

From the foregoing description it will readily appear that I have produced such a gage for irrigating water as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A water gage comprising the following elements in combination, namely, a box having an inlet, an upwardly projecting plate on said box, such plate having indicated thereon a scale, a float in said box, a rod on said float, a guide on said rod moving over said plate, and a marking means carried by said rod and adapted to mark on said plate as described.

In testimony whereof I affix my signature in presence of two witnesses.

THOMPSON R. BUTTS.

Witnesses:
PERCY S. WEBSTER,
FRANK H. CARTER.

Copies of this patent may be obtained for five cents each, by addressing the "Commissioner of Patents, Washington, D. C."